Figure 1:
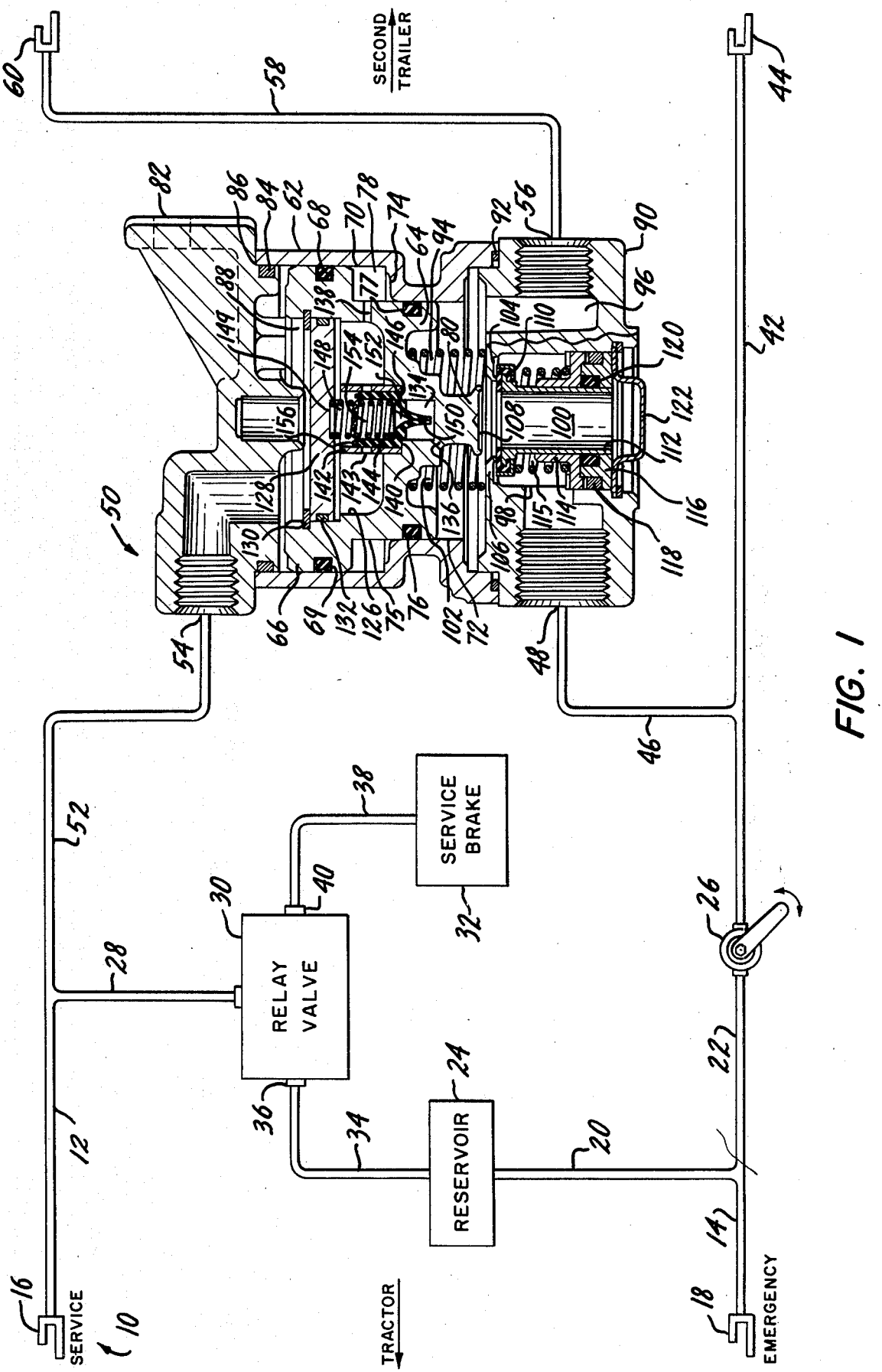

United States Patent [19]  [11] 4,354,713
Edwards  [45] Oct. 19, 1982

[54] DUAL AREA METERING VALVE WITH VARIABLE REACTION ASSEMBLY

[75] Inventor: Norman Edwards, Florence, Ky.

[73] Assignee: Echlin Inc., Branford, Conn.

[21] Appl. No.: 206,524

[22] Filed: Nov. 13, 1980

[51] Int. Cl.³ .............................................. B60T 15/02
[52] U.S. Cl. .............................................. 303/8; 303/40
[58] Field of Search ............ 303/7, 8, 25, 26, 40, 303/47–49

[56] References Cited

U.S. PATENT DOCUMENTS

| | | | |
|---|---|---|---|
| 3,001,831 | 9/1961 | Stelzer | 303/7 |
| 3,411,836 | 11/1968 | Dobrikin et al. | 303/40 |
| 4,076,325 | 2/1978 | Bray . | |
| 4,090,738 | 5/1978 | Bray | 303/7 |

Primary Examiner—Duane A. Reger
Attorney, Agent, or Firm—Jon Carl Gealow; Ronald J. LaPorte; James A. Gabala

[57] ABSTRACT

The invention relates to a service brake system for towed vehicles and particularly to a service brake system for double trailer combinations and a metering relay valve therefor. According to the invention, a variable reaction amplifying relay valve, controlled by service brake control line pressure, meters reservoir pressure from the leading trailer to the service brake control line in the trailing trailer. Below a predetermined pressure, the metering relay valve provides an amplified pressure output relative to input. Above this predetermined point, the output pressure is substantially one-to-one.

28 Claims, 1 Drawing Figure

DUAL AREA METERING VALVE WITH VARIABLE REACTION ASSEMBLY

BACKGROUND OF THE INVENTION

The invention relates to a service brake system for towed vehicles and particularly to a service brake system for double trailer combinations. It also particularly relates to a metering relay valve for use in such systems.

In known fluid-actuated service brake systems, the service braking is effected by pulses of fluid pressure induced in a service brake control line controlling a relay valve near the brake actuators. It is well known that because of the travel time of the fluid pressure pulses due to the distance between the towing vehicle or tractor and the towed vehicle or trailer, the brakes of the tractor may be applied prior to the application of the brakes in the towed vehicle. This problem is further compounded in a following second trailer or a trailing towed vehicle.

Various attempts have been made to increase the reaction speed to trailer braking. One solution has been the use of electrically operated valves which open or close by electrical command pulses. However, these known valves require additional electrical wiring and control features which add complexity and greater chance for failure.

Another approach, taught by Stelzer in the U.S. Pat. No. 3,001,831 discloses an auxiliary valve interposed in the service brake line near the conventional emergency relay valve in order to increase the reaction speed of trailer braking. The valving action taught therein is that for a light pressure pulse in the service control line, the trailer braking pressure is to be brought to a point of nearly full braking pressure and then reduced ratio thereafter until at another point the delivered braking pressure is again finally approximately one to one with input pressure. While this valve reduced the delivery time of air pressure because of the amplification in the valve, there is no teaching of intermediate responsive control. Bray, in U.S. Pat. No. 4,090,738 teaches a booster air assembly including a relay valve having a closely coupled auxiliary air tank which may also be incorporated in a double trailer combination. The amplification of this valve is in one to one ratio up to a predetermined point where it increases to a ratio of 1.3 to 1. Speedup is predicated only upon the close proximity of the reservoir tank to the remainder of the system.

SUMMARY OF THE INVENTION

The present invention provides a desirable quick response of actuation of the brakes in a trailing vehicle of a double trailer combination at low control pressures in the service line of the leading trailer and at the same time there is an intermediate responsive control of pressure whereby the pressure to the brake actuators of the following trailer is increased in relation to the pressure in the service brake control line. It is only after the pressure in the service brake control line of the following trailer has reached a predetermined point that the brake pressure will correspond in substantially 1:1 ratio with the control pressure.

In a system according to the invention, a variable-reaction amplifying relay is interconnected so as to be controlled by the service brake control line of the leading trailer. Air pressure from the conventional emergency line and the reservoir of the leading trailer is fed, under the control of the variable-reaction amplifying relay valve, to the service control line of the following trailer or towed vehicle. For trailing vehicle service control line pressure below a predetermined point, the variable reaction amplifying relay valve provides an amplified output pressure relative to the input pressure. Above this predetermined point the trailing vehicle service brake control line pressure is in one-to-one ratio with increases in the service brake control pressure.

In an embodiment of the valve of the invention, a reaction piston is disposed in a cavity within an upper valve body. The cavity may be a stepped bore having one portion of relatively larger cross section than another. The reaction piston then comprises a piston head of relatively large cross section, slidingly and sealingly disposed in the portion of the stepped bore having the corresponding large cross section and an opposing piston head slidingly and sealingly disposed in the other portion of the stepped bore having a correspondingly smaller cross-section. In combination with a cover and a lower valve body the reaction piston divides the cavity into three separate chambers: a service control chamber of relatively large cross section between the cover and large piston head, a delivery chamber of smaller cross section at the opposite end of the stepped bore between the lower valve body and the smaller piston head, and a reaction chamber in a space between the piston heads.

The service control chamber is in pressure communication with the service brake control line so that the reaction piston will move in response to the pressure in this line. The delivery chamber below the reaction chamber is selectively connected to an exhaust port for exhausting pressure from the delivery chamber or to a reservoir port for supplying pressure to a delivery port also in fluid communication with the delivery chamber.

The movement of the reaction piston in one direction is operative to control a valve member in the lower valve body which serves to both open the communication with the reservoir port for supplying fluid pressure to the delivery chamber and to maintaining an exhaust valve portion in a closed position; movement of the reaction piston in the opposite direction will close communication with the reservoir port and open the delivery chamber to atmospheric pressure through the exhaust valve portion. The position of the reaction piston at one point is such that both the exhaust valve and the reservoir port are sealed from the delivery chamber so that a given pressure is maintained in the delivery chamber. This balanced position is conventionally termed a lapped position.

In the lapped position, the pressure in the delivery chamber is such that the force against the smaller piston head exactly counterbalances the force due to the pressure in the control chamber against the large reaction piston head. When the reaction piston is force balanced, the ratio of pressure in the delivery chamber to the pressure in the control chamber is termed the amplification factor of the valve. The valve assembly thus enables a fluid pressure output to be amplified by a predetermined factor depending in known manner upon the ratio of cross sectional areas of the piston heads. That is, upon application of a given amount of pressure in the service control chamber, a corresponding amplified pressure will be supplied at the delivery port of the variable reaction amplifying valve.

According to the invention, the variable reaction amplifying valve has further a reaction chamber defined by the enclosed volume between the seals of the large and small piston heads. Fluid pressure in this reaction chamber will provide an opposing pressure against the same effective area of the reaction piston as that in the service control chamber itself. The reaction chamber is in selective fluid communication with the delivery chamber so that until a predetermined pressure is reached, the reaction chamber is isolated from the delivery chamber. Fluid communication between the reaction chamber and the delivery chamber, through, for instance, a bore may be controlled by a check valve, which may be biased into a closed position by a suitable resilient means so that until a predetermined pressure is reached in the delivery chamber, there is no fluid communication from the delivery chamber to the reaction chamber. The force of the resilient means can be utilized to determine the point at which fluid communication will be initiated and also to assure that a pressure differential will be maintained between the reaction chamber and the delivery chamber. A pressure return check valve arrangement enables fluid communication between the reaction chamber and the delivery chamber whenever the fluid pressure in the reaction chamber exceeds that of the delivery chamber.

Preferably, in order to establish the selective pressure communication, a reaction piston chamber is created within the reaction piston itself. This chamber is in open fluid communication with the reaction chamber. A blind axial bore extends from the chamber through the interior of the reaction piston into the small piston head. The blind axial bore is in fluid communication with the delivery chamber.

A check valve arrangement is disposed in the axial bore to control the fluid communication. A resilient plug member is adapted to abut sealingly against a shoulder, for example, in this bore and may be biased into the closed position by a strong spring whose force may be calculated to correspond to the predetermined pressure at which it is desired to change the ratio of pressures from an amplified to substantially a one-to-one ratio.

The return check valve may take the form of any well known conventional check valve arrangements but preferably, the resilient plug member is a hollow cylinder terminating in a pair of flaps on the lower portion of the resilient member forming a communicating slot between the reaction piston chamber and the blind axial bore. These flaps protrude into the bore so that the pressure on the delivery side against the outside of the flaps further tends to seal the flaps more tightly while pressure in the opposite direction, i.e., when the pressure in the reaction piston chamber is greater than the delivery chamber pressure, tends easily to force the flaps apart to allow the escape of pressure.

It will be clear to persons skilled in the art that the variable reaction amplifying relay valve will operate so as to have an amplified pressure ratio so long as the pressure in the delivery chamber is below the predetermined point set by the check valve arrangement and at all higher pressures thereafter will provide a substantially one-to-one ratio of increases in control pressure to increases in outlet delivery pressure.

FIG. 1 is a diagrammatic view of a trailer brake system, the relay valve mechanism being structurally shown in section.

Referring to the drawing, the numeral 10 designates the schematic representation of the trailer brake system, in which a service line 12 and an emergency line 14 have glad hand connectors 16 and 18, respectively, for connection to mating connectors of conventional service and emergency output lines on a tractor (not shown). The emergency line 14 branches into two lines 20 and 22, line 20 being connected to a reservoir 24 and line 22 leading to a shut-off cock 26. The service line 12 also branches with a branch 28 leading to a conventional relay valve 30. Relay valve 30 is interposed between the reservoir 24 and conventional service brake actuators 32. A line 34 leads from the reservoir 24 to the reservoir port 36 of the relay valve 30 and the service brake actuators 32 are connected through line 38 to the delivery port 40 of this relay valve.

After the shut-off cock 26, emergency line branch 22 branches again so that one branch 42 leads to an output emergency line connector 44 and the second branch 46 leads to a reservoir port 48 of the variable reaction amplifying relay valve according to the invention shown generally at 50. A branch 52 of the service line 12 connects to the service port 54 of valve 50. The delivery port 56 of the valve 50 connects through line 58 to a service line connector 60.

Preferably, the service line connector 60 and the emergency line connector 44, respectively substantially match the tractor mating connectors (not shown). The connectors 44 and 60 are also adapted to connect to the input service and emergency connectors of a second trailing vehicle. Preferably the system shown here for one trailer is substantially identical to the second trailing vehicle so that the trailer position as either lead or following towed vehicle in a double trailering is irrelevant. In the system illustrated, the stop cock 26 is open when the trailer is in the lead position and closed when the trailer is in a following position, the variable reaction amplifying relay valve 50 according to the invention being utilized only when the trailer is in a leading position. While valve 50 is especially adapted for use in connection with a double trailer arrangement, the valve may be installed in a tractor in similar manner to provide intermediate responsive control of pressure to the brake actuators of a single towed vehicle or trailer which does not have a valve 50.

In FIG. 1 the variable reaction amplifying relay valve is shown generally at 50. An upper valve body 62 of suitable metal has a stepped bore having a reaction piston 64 slidingly and sealingly disposed therein. The reaction piston 64 also of suitable metal comprises a piston head 66 sealed by sealing annular ring 68, which may conveniently be a neoprene O-ring engaged in a slot 69, sliding in a portion 70 of corresponding cross-section in the stepped bore. A step 72 of the stepped bore is connected to the step 70 by a shoulder 74. A correspondingly stepped portion 75 of the reaction piston sealed with sealing ring 76, preferably of neoprene, engaged in a slot 77, is slidably sealed within the stepped portion 72.

The steps of the reaction piston 64 and corresponding steps 70 and 72 and shoulder 74 of the stepped bore define a reaction chamber 78 between the two sealing rings 68 and 76. The reaction piston 64 has an extension 80 extending into the lower portion of the upper valve body 62.

A cover 82 having the service port 54 is affixed to the top of the upper valve body by conventional means such as a plurality of threaded bolts (not shown) and carries a seal 84 in a slot 86 between the upper valve body 62 and the cover 82. The valve cover 82 and the reaction piston head define a service control pressure chamber 88.

A lower valve body 90 is affixed to the upper valve body 62 by conventional means (not shown). An annular seal 92 seals between the upper 62 and lower 90 valve bodies to define a delivery chamber 94 between the lower portion of the reaction piston at sealing ring 76 and the upper surface of the lower valve body 90. Delivery port 56 in the lower valve body 90 is in fluid communication with the delivery chamber 94 through a chamber 96. An axial bore 98 in the lower valve body 90 houses an exhaust-inlet valve assembly 100 further described below and reservoir port 48 is in direct fluid communication with this axial bore 98.

A piston-return spring 102 biases the reaction piston 64 to the upward position illustrated in FIG. 1.

Aperture 104 at the top of the axial bore 98 in the lower valve body 90 enables downward passage of extension 80 of the reaction piston 64. The annular lip 106 of this aperture forms a valve seat for the inlet valve portion of the inlet-exhaust valve 100 as described below. The tip 108 of extension 80 and a lip 110 of the inlet-exhaust valve assembly 100 cooperate to form an exhaust valve portion.

The inlet-exhaust valve assembly 100 comprises an exhaust tube 112 having a flanged lip 110 at the top thereof. The tube 112 slides in a valve guide 114 and is biased into a normally closed position by a valve return spring 115 between the guide 114 and lip 110. In this normally closed position, the reservoir port 48 is sealed from the delivery chamber 94 by the sealing abutment of flanged lip 110 against aperture lip 106. The delivery chamber 94 is open to atmospheric pressure through the tube 112. Downward movement of the reaction piston through aperture 104 brings the lip 108 of extension 80 into sealing abutment with the lip 110 of the inlet-exhaust valve assembly 100. The sealing abutment seals the delivery chamber 94 from the exhaust tube 112. Upon further downward movement of the extension 80, the flanged lip 110 of the exhaust tube is forced from abutment against lip 106 which opens the reservoir port 48 to delivery chamber 94.

A valve guide retainer 116 is sealed in the bore 98 by annular seal 118. An O-ring 120 between the exhaust tube 112 and the retainer 116 provides a pressure seal for the moveable valve assembly 100. An exhaust shield 122 and the retainer 116 are held in place against the downward pressure of the valve return spring 115 by suitable means such as snap ring 124.

The top of the reaction piston 64 comprises a cavity portion 126, suitably a cylinder of revolution, closed above by a retainer 128 held in place against a shoulder of the cavity in suitable manner, conveniently a snapring 130. A seal 132, suitably neoprene, provides a pressure seal. A blind bore 134 extends from the cavity 126 into the extension 80 of the reaction piston 64. A small bore 136 connects the delivery chamber 94 with the blind bore 134. A second small bore 138 connects the cavity 126 with the reaction chamber 78.

The blind bore 134 has a shoulder 140 on which rests a tubular valve guide 142 in force fit with the sides of the bore 134. The valve guide 142 extends nearly to the lower surface of the retainer 128, but is always preferably manufactured to be of slightly shorter dimension than this in order to avoid a critically tight fit between the valve guide 142 and the retainer 128. The valve guide 142 has two small apertures 143 on opposite sides thereof opening into the chamber 126.

A tubular rubber member 144 is slideable within the valve guide 142. Shoulders 146 of the tubular rubber member 144 sealingly abut the shoulders 140 of the blind bore 134 when normally biased into this position by check valve spring 148. The upper end of the check valve spring 148 may conveniently rest in a retaining aperture 149 in the retainer 128.

The portion of the tubular rubber member 144 below the shoulders 146 comprises two flaps 150 extending downward to form a resilient cylindrical slot 152 which somoothly changes to circular aperture 154 forming the interior of tubular rubber member 144. The top portion of the tubular rubber member 144 has a plurality of spaced small spherical proturberances 156 which allow passage of air even when the resilient member is in abutment with the retainer 128. Similarly, the exterior sides of the tubular rubber member 144 may have ridges (not shown) parallel to its axis to assure passage of fluid from the blind bore 134 through the valve guide to apertures 143 whenever the tubular rubber member 144 is not seated.

For operation of the service brakes when the system of FIG. 1 is installed in the leading trailer, the shut-off cock 26 is turned to the open position. Emergency fluid pressure is then fed from the mating connector (not shown) of a tractor emergency connector 18 to provide fluid pressure to the reservoir 24 and line 46 and 42 up to the maximum emergency fluid pressure for example 100 psi. Connector 44 then transmits the emergency pressure to a similar connector 18 in the following trailer.

When the system is in use on a trailer in the following position, the shut-off valve 26 is placed in the off-position and no fluid pressure is transmitted to lines 42 and 46. Thus the portion utilized when the system is in the following trailer position is the reservoir 24, relay valve 30 and brake actuators 32. The relay valve 30 operates upon application of service control pressure through line 28 to deliver reservoir pressure to brake actuators 32 of the following trailer. The service air delivered to the following trailer through glad-hand 60 and line 28 in the following trailer is supplied by valve 50 of the leading trailer in accordance with the present invention.

Referring again to FIG. 1, the stop cock 26 is open in the leading trailer and service line pressure is delivered to service port 54 of valve 50 through line 12 and 52 to establish control pressure in chamber 88 of valve 50 in the leading trailer when the brakes are actuated in the tractor. The pressure in chamber 88 begins to move the reaction piston 64 in a downward direction until the tip 108 of extension 80 abuts lip 110 of the inlet-exhaust valve 100. At this point, delivery chamber 94 is sealed off from fluid communication with the exhaust tube 112 of inlet-exhaust valve assembly 100. Further downward motion of the reaction piston 64 compresses valve return spring 115 and opens the inlet valve formed by the abutment of lip 110 of the inlet-exhaust valve and lip 106 of the aperture 104. In this position, the delivery chamber 94 and thereby the delivery port 56 are in fluid communication with the reservoir port 48. The delivery chamber pressure thus begins to build toward the full emergency line pressure.

As the pressure in the delivery chamber 94 begins to build, the force against the lower piston head opposing the downward motion of the reaction piston 64 will increase. The effective area of the upper piston head of the reaction piston is greater than the effective area of the lower piston head of the reaction piston by an amount which provides an amplification ratio in a known manner, preferably a ratio of 1.75 to 1. Thus, as the pressure in the delivery chamber 94 builds to approximately 1.75 times the pressure in the service control chamber 88, the reaction piston 64 moves to a position that balances all of the forces upon it. In the balanced position, the inlet valve is closed and lip 110 of valve assembly 100 is seated on lip 106. When in balance, the force provided by the pressure in the service chamber against the larger piston head 66 is counter balanced by the force of the air pressure against the lower piston head and the force provided by the piston return spring 102. At the balance point, also known as the lapped position, the exhaust valve 103,110 remains closed so that a pressure of approximately 1.75 times the control pressure is maintained in delivery chamber 94. This pressure relationship is maintained for delivery chamber pressures up to a predetermined pressure point, which may for example, but not as a limitation, be 30 psi. Other predetermined points may of course be utilized depending upon such factors as the length of conduit connected to the delivery port as well as the parameters of the conventional relay valve 30 chosen for use in the system.

Until the predetermined pressure is reached, the tubular rubber member 144 remains closed by being biased against the shoulder 146 of the blind bore 134 in the reaction piston 64. The flaps 150 of the tubular rubber member remain tightly compressed by the pressure in the delivery chamber 94. The pressure in the delivery chamber is finally sufficient to overcome the force of check valve spring 148 and the tubular rubber member is opened and forced away from the shoulder 140. Fluid pressure is thus transmitted through small bore 136 through blind bore 134 and passed through apertures 143 in the guide member into cavity 126. Cavity 126 is in fluid communication with the reaction chamber 78 through small bore 138. Once the pressure inside the cavity 126 is sufficient so that the force on the tubular rubber member 144 plus that of valve spring 148 matches the force on the delivery chamber side of the tubular rubber member, the tubular rubber member once again seats against shoulder 140. Thus, a metered amount of pressure, with a pressure differential corresponding to the force of the chosen valve spring 148, is metered to the reaction chamber 78.

The new differential pressure in the reaction chamber 78 acts on an additional surface area which when combined with the surface area of the reaction piston 64 in the delivery chamber 94 is equal to the full area at the top of the reaction piston in service control chamber 88. Thus, above the predetermined point, the change in pressure at the delivery chamber and thus the delivery port is decreased to a ratio of one-to-one with that of the control pressure instead of an amplified ratio.

When service control line pressure is released, pressure quickly exhausts from the service pressure control chamber 88 through service port 54. The forces on the reaction piston 64 are thus unbalanced and the reaction piston travels rapidly upward impelled by the pressure unbalance as well as the piston return spring 102. As the extension 80 lifts from the lapped position, the inlet valve portion (106,110) remains closed and the exhaust valve portion (110 103) opens to quickly exhaust pressure from the delivery port 56 and the delivery chamber 94. As the pressure in the delivery chamber decreases below that in the cavity 126 in the reaction piston 64, the flaps 150 of the tubular rubber member are forced open by the increased pressure in the cavity 126 over that of the delivery chamber 94 and reaction chamber 78 and cavity 126 are exhausted through the exhaust valve (110,103). The reaction piston 64 finally returns to the position shown in FIG. 1, awaiting the next cycle of brake application and release.

Service air pressure delivered by valve 50 to the relay valve (30) which actuates the brakes in the second following trailer is at first supplied in a selected amplified ratio to the service air that actuates the brake relay valve in the leading trailer. This gives a quick response to brake actuation and an intermediate responsive control of pressure to the brake relay valve in the second following trailer until the pressure delivered by valve 50 reaches the selected predetermined level. Thereafter service air pressure on the relay valve 30 in both trailers is generally equal.

It will be clear to anyone skilled in this art that the ratios of effective areas of the upper and lower piston heads of the reaction piston may be varied to provide amplification other than 1.75 to 1. It is also clear that various predetermined points for the change from an amplified output to a one-to-one ratio output may be made by changing either or both the force of the valve return spring 148 or the diameters of the bore 134.

It will be understood that the claims are intended to cover all changes and modifications of the preferred embodiment of the invention, herein chosen for the purpose of illustration which do not constitute departures from the spirit and scope of the invention.

What is claimed is:

1. In a service brake system for a trailer, said service brake system having at least one pair of service brakes, a fluid pressure reservoir, an emergency line for providing fluid pressure to said reservoir, a service brake control line, means for actuating said at least one pair of service brakes in response to fluid pressure in said service brake control line, means for connecting pressure from said emergency line to an emergency line of a following trailer, a variable reaction amplifying relay valve connected to said service brake control line, said valve being adapted to provide amplified metering of fluid pressure from said reservoir and emergency line to another service line for fluid pressure in said another service line below a predetermined pressure in response to fluid pressure in said service brake control line, the metering fluid pressure above said predetermined point being in substantially one-to-one ratio of fluid pressure in said service brake control line to fluid pressure in said another service line and means for connecting said another service line to a service line of said following trailer.

2. The service brake system according to claim 1 comprising a shut-off valve for closing said emergency line prior to connection with said following trailer.

3. A service brake system according to claim 1 further comprising a second trailer having substantially identical elements as the first trailer.

4. The service brake system according to claim 1 wherein said variable reaction amplifying relay valve amplifies at a ratio of 1.75 to 1 to a predetermined split point pressure in said another service line.

5. The service brake system of claim 4 wherein the split point is 30 psi of pressure in said another service line.

6. The service brake system according to claim 1 wherein the amplification in said variable reaction amplifying relay valve is accomplished by the proportionate cross-sections of a reaction piston in said variable reaction amplifying relay valve, the piston proportionate areas having a ratio of one-to-one above said splitpoint.

7. A relay valve comprising:
(a) a housing having a cavity therein, said cavity having a first portion of larger cross-section than a second portion thereof;
(b) a reaction piston disposed in said cavity;
(c) said reaction piston, upon movement thereof in one direction, being adapted to open an inlet valve for admission of fluid pressure and close an exhaust valve;
(d) said reaction piston, upon movement thereof in the opposite direction being adapted to close said inlet valve and open said exhaust valve for exhausting of fluid pressure;
(e) said reaction piston comprising a large piston head slidingly and sealingly received in said first portion and a small piston head slidingly and sealingly received in said second portion;
(f) said large and small piston heads respectively defining in said cavity a service chamber in said large portion, a delivery chamber in said small portion, and a reaction chamber between said large and said small piston heads;
(g) said reaction chamber being in selective fluid communication with said delivery chamber by means for providing passage of fluid pressure to said reaction chamber whenever said delivery chamber has pressure higher than a predetermined pressure; and
(h) means for communicating pressure in said reaction chamber to said delivery chamber whenever said reaction chamber has a higher pressure than said delivery chamber.

8. A relay valve according to claim 7 wherein said reaction piston heads are of cross-section as to provide an amplification ratio of 1.75 to 1 in delivery chamber pressure to service chamber pressure.

9. The relay valve according to claim 7 wherein said means for providing passage of fluid pressure to said reaction chamber comprises a check valve.

10. The relay valve of claim 9 further comprising a bore in said reaction piston housing said check valve, one end of said bore being in fluid communication with said reaction chamber and the other end of said bore being in fluid communication with said delivery chamber.

11. The relay valve of claim 10 wherein said check valve is a tubular rubber member operative to sealingly abut against a shoulder of said bore, said tubular rubber member being normally biased into sealing abutment with said shoulder.

12. The relay valve according to claim 11 wherein said tubular rubber member is biased by a spring adapted for compression at a predetermined pressure on the tubular rubber member.

13. The relay valve according to claim 12 wherein said means for communicating pressure in said reaction chamber is a pair of flaps forming an extended slot on said tubular rubber member, said flaps being operative to open whenever the pressure on the inside surfaces of said flaps is greater than that on the outside surfaces of said flaps.

14. The relay valve according to claim 7 wherein said means for communicating pressure is a check valve.

15. In an amplifying relay valve of the type having a reaction piston in a bore therein, the movement of said reaction piston being adapted for simultaneous operation of an exhaust valve, said reaction piston defining a service chamber and a delivery chamber in said amplifying relay valve, the improvement comprising a reaction chamber defined in said bore between the ends of said reaction piston, said reaction chamber being in selective communication with said delivery chamber by means adapted to transmit metered pressure from said delivery chamber to said reaction chamber only when the pressure in said delivery chamber exceeds a predetermined value and to exhaust pressure from said reaction chamber to said delivery chamber whenever the pressure in said reaction chamber is greater than the pressure in said delivery chamber.

16. A variable reaction amplifying relay valve comprising:
(a) a housing having a cavity therein, said cavity having a first portion of larger cross section than a second portion thereof;
(b) a reaction piston disposed in said cavity;
(c) said reaction piston, upon movement thereof in one direction, being adapted to open inlet valve for admission of fluid pressure and to close an exhaust valve;
(d) said reaction piston, upon movement thereof in the opposite direction being adapted to close said inlet valve and to open said exhaust valve for exhausting of fluid pressure;
(e) said reaction piston comprising a large piston head slidingly and sealingly received in said first portion and a small piston head slidingly and sealingly received in said second portion;
(f) said large and small piston heads defining in said cavity a service chamber in said large portion, a delivery chamber in said small portion, and a reaction chamber between said large and said small piston heads;
(g) said large piston head having a reaction piston chamber therein;
(h) said small piston head having a blind bore extending from said reaction piston chamber;
(i) said reaction piston having a bore for fluid communication between said reaction piston chamber and said reaction chamber;
(j) said reaction piston having a second bore for fluid communication between said blind bore and said delivery chamber;
(k) a tubular rubber member slidingly received in said blind bore and adapted to sealingly abut a shoulder thereof;
(l) a pair of flaps at one end of said tubular rubber member, said flaps forming an extended slot communicating with the interior of said tubular rubber member; and
(m) a spring, said spring biasing said tubular rubber member into sealing abutment with said should of said bore.

17. A valve for use in a vehicle brake system for changing the ratio of delivered fluid pressure for the brakes in relation to fluid pressure which actuates the valve comprising:
(a) a housing;
(b) a piston slidably mounted in said housing;
(c) said piston having a first surface area, and (d) first means in said valve for supplying a first fluid pressure to said first surface area to generate a force urging the piston to move in one direction;

(e) second means in said valve for supplying a second separate fluid pressure to said third opposite surface area to generate a force urging the piston to move opposite to said one direction and for delivering fluid pressure supplied to said third opposed surface area, in a first ratio in relation to said first fluid pressure;

(f) fluid conduit means in said valve for connecting fluid pressure supplied to said third opposed surface area to said second opposed surface area to increase the force urging the piston to move opposite to said one direction;

(g) control means for opening said fluid conduit means when said fluid pressure supplied to said third opposed surface area reaches a predetermined level to increase the force urging the piston to move opposite said one direction and thereby change the delivered fluid pressure to a second ratio in relation to said first fluid pressure, said control means being operative to close said fluid conduit means when said second separate fluid pressure supplied to said third opposed surface is below said predetermined level;

(h) exhaust means for releasing the second separate fluid pressure supplied to said third opposed surface when the first fluid pressure is released from said first surface area of said piston;

(i) said control means being further operative for releasing pressure supplied to said second opposed surface area when the pressure supplied to said third opposed surface area is less than the pressure applied to said second opposed surface area.

18. The structure of claim 17 in which the third opposed surface area is smaller than said first surface area of the piston.

19. The structure of claim 17 in which the combined surface area of the second and third opposed surface areas is substantially equal to the first surface area of the piston.

20. The structure of claim 17 in which the control means includes check valve means which remain closed when the fluid pressure supplied to said third opposed surface area is greater than the fluid pressure applied to said second opposed surface area and which check valve means open to release pressure applied to said second opposed surface area when the pressure supplied to said third opposed surface area is less than the pressure applied to said second opposed surface area.

21. The structure of claim 17 in which the conduit means and the control means are mounted on and carried by said piston.

22. The structure of claim 17 in which the second means for supplying fluid pressure to said third opposed surface area includes a valve member which is urged toward an open position by said piston moving in said one direction.

23. A service air brake system for a tractor and at least one towed vehicle which comprise:
(a) first air pressure supply means;
(b) second air pressure supply means;
(c) first service brake actuators;
(d) second service brake actuators;
(e) first valve means actuated by said first air pressure supply means for supplying air pressure from said second air supply means to said first service brake actuators;
(f) second valve means;
(g) third valve means;
(h) said second valve means being actuated by said first air pressure supply means for supplying air pressure from said second air pressure supply means to said third valve means;
(i) said third valve means being actuated by air pressure received from said second valve means for supplying air pressure from said second air pressure supply means to said second service brake actuators.

24. The system of claim 23 in which the first and second valve means and first service brake actuators are in the tractor and said third valve means and second brake actuators are in the towed vehicle.

25. The system of claim 23 in which there are two towed vehicles and in which the first and second valve means and first brake actuators are in the first towed vehicle and the third valve means and second brake actuators are in the second towed vehicle.

26. The system of claim 23 in which the second valve means are adapted to deliver air pressure to said third valve means greater than the actuating air pressure of said first air pressure supply means up to a predetermined level and to deliver air pressure to said third valve means substantially equal to said actuating air pressure when above said predetermined level.

27. A service air brake system for a towed vehicle which comprises:
(a) first air pressure supply means;
(b) second air pressure supply means;
(c) service brake actuators;
(d) first valve means;
(e) third air pressure means for supplying air pressure from said first air pressure supply means to said first valve means for actuating said first valve means;
(f) fourth air pressure means for supplying separate air pressure from said second air pressure supply means to said first valve means for delivery to said service brake actuators;
(g) second valve means;
(h) fifth air pressure means for supplying air pressure from said first air pressure supply means to said second valve means for actuating said second valve means;
(i) sixth air pressure means for supplying separate air pressure from second air pressure supply means to said second valve means for delivery to a second towed vehicle upon actuation of said second valve means;
(j) shut off valve means for discontinuing the supply of air pressure to said second valve means from said second air pressure supply means.

28. The system of claim 27 in which the second valve means are adapted to deliver air pressure greater than that supplied by said fifth air pressure means up to a predetermined level of the supplied air pressure from said fifth air pressure means and to deliver air pressure substantially equal to the air pressure supplied by said fifth air pressure means when above said predetermined level.

* * * * *